(No Model.)
J. C. VAIL.
SHOCK COMPRESSOR.
No. 444,787. Patented Jan. 13, 1891.
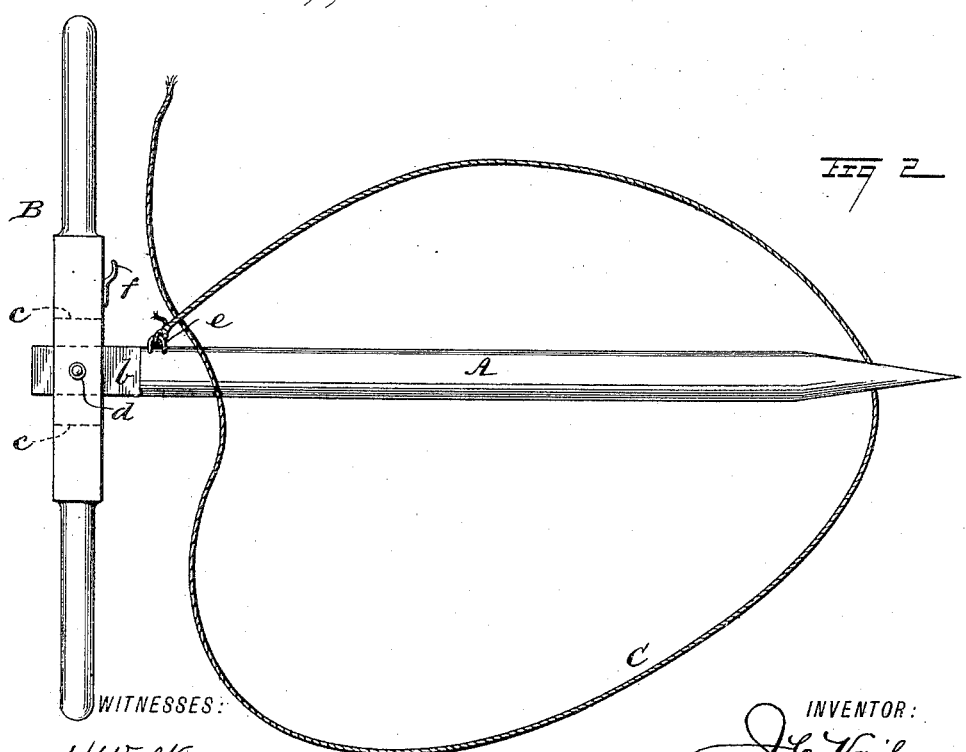
WITNESSES:
H. Walker
C. Sedgwick
INVENTOR:
J. C. Vail
BY
Munn & Co.
ATTORNEYS

UNITED STATES PATENT OFFICE.

JOSEPH C. VAIL, OF MAPLE'S MILL, ASSIGNOR TO HIMSELF AND GEORGE W. RAY, OF BRYANT, ILLINOIS.

SHOCK-COMPRESSOR.

SPECIFICATION forming part of Letters Patent No. 444,787, dated January 13, 1891.

Application filed October 21, 1890. Serial No. 368,790. (No model.)

*To all whom it may concern:*

Be it known that I, JOSEPH C. VAIL, of Maple's Mill, in the county of Fulton and State of Illinois, have invented a new and useful Improvement in Fodder-Binders, of which the following is a full, clear, and exact description.

This invention relates to that description of fodder or corn-shock compressors and binders which employ a shaft adapted to be thrust into the body of grain, and which is provided with a cross-bar handle on its outer end for rotating or turning it, also with a cord connected with said shaft that is drawn tightly around the shock by the turning of the shaft to compress and bind the shock ready for tying.

The invention consists in a device of this kind of novel construction, substantially as hereinafter described, and more particularly pointed out in the claims.

Reference is to be had to the accompanying drawings, forming a part of this specification, in which similar letters of reference indicate corresponding parts in both the figures.

Figure 1 represents a view in perspective of my improved binder applied to a shock of grain and as having bound the same and holding it bound, and Fig. 2 is a longitudinal view or plan of the device upon a larger scale than in the previous figure.

A is the shaft, preferably of circular shape, and made tapering at its point to facilitate its entry within the shock and of being rotated or turned while therein.

B is the cross-bar or double handle attached to the back or outer end of the shaft, so as to admit of its being swiveled or made to occupy different angular positions relatively to the axial line of the shaft A—as, for instance, by constructing the back end of the shaft with a tenon *b* and fitting the same within or through an elongated mortise *c* in the double handle and securing it therein by a bolt or pivot *d*, with freedom to turn.

C is a cord or rope, one end of which is attached to the shaft A near the handle—as, for instance, by a staple *e*. This cord is of the requisite length to pass around the fodder or corn shock and to be wound up for a portion of its length around the shaft A by the rotation of the latter. Secured to the double handle or cross-bar B is a cleat *f* for holding the end of the cord while it is being carried around the corn-shock.

In using the binder the shaft A is thrust into the corn-shock S at the height the latter should be bound and the loose end of the cord passed around the shock, the same passing between the fastened end of the cord and the shaft. The shaft A is then rotated by the handle B, thereby winding up the cord, and so compressing and binding the shock S. When the shock of fodder is drawn tight enough, the rotation of the binder or its shaft A is stopped while the handle B occupies an upright or nearly upright position, and by its swiveling provision the lower end of said handle is projected, as shown in Fig. 1, in between the stalks of fodder, which holds the binder from unwinding while the shock is being tied. There are other advantages, however, in making the double handle B adjustable, as described. Thus in putting up a shock of corn-fodder the stalks of corn are set slanting, so that when the shock is finished and ready to tie it increases in size from near the top to the bottom. Now were the handle not made to swivel on the shaft, but made immovable on the shaft and at right angles with the axis thereof, it would be apt during the rotation of the shaft to come in contact with the stalks and so interfere with the operation of the binder, whereas by my swiveling handle the end of it which is down can be pulled away from the shock. Such swiveling double handle, therefore, it will be seen, is very different to a single crank fast on the shaft and fitted with a handle arranged to slide parallel with the shaft to merely lock the binder by entry within the shock while the latter is being tied.

Having thus fully described my invention, I claim as new and desire to secure by Letters Patent—

1. In a fodder or shock binder of the character herein referred to, the combination, with the cord-winding shaft of the binder, of an attached handle for rotating said shaft fitted to swivel so as to occupy different angular positions relatively to the axial line of the shaft, substantially as and for the purposes specified.

2. In a fodder or shock binder, the combination of the shaft A, having a tenon-shaped rear portion $b$, the swiveling double handle B, having an elongated mortise $c$ and cleats $f$, the pivot $d$, uniting said tenon portion of the shaft and mortised portion of the handle through or in which said tenon portion fits, and the cord C, fastened at its one end to the shaft near the handle, essentially as shown and described.

JOSEPH C. VAIL.

Witnesses:
MOSES TURNER,
GEO. K. LINTON.